3,729,487
2-HALO-3-AMINOTHIETANE AND 2H-THIETE-1,1-DIOXIDES

Melvin Harris Rosen, Florham Park, and Herbert Morton Blatter, Summit, N.J., assignors to Ciba-Geigy Corporation, Ardsley, N.Y.
No Drawing. Continuation-in-part of application Ser. No. 768,546, Oct. 17, 1968, now Patent No. 3,644,632, dated Feb. 22, 1972. This application Dec. 16, 1970, Ser. No. 98,936
Int. Cl. A61k *27/00;* C07d *61/00*
U.S. Cl. 260—327 R                                                      4 Claims

ABSTRACT OF THE DISCLOSURE

2 - halo - 3 - aminothiethane- or 2H-thiete-1,1-dioxides, e.g. those of the formula $$\begin{array}{c} Am\text{---}X \\ R_1\text{---}SO_2 \\ R_2 \end{array}$$

X = halogen
Am = dialkylamino or alkyleneimino
$R_{1,2}$ = H or alkyl or their 3-dehydro-derivatives exhibit anti-inflammatory effects.

CROSS-REFERENCES TO RELATED APPLICATIONS

This is a continuation-in-part of application Ser. No. 768,546 filed Oct. 17, 1968 now U.S. Pat. No. 3,644,632, issued Feb. 22, 1972.

SUMMARY OF THE INVENTION

The present invention concerns and has for its object the provision of new 2-halo-3-aminothietane or -2H-thiete-1,1-dioxides, more particularly of those of Formula I $$\begin{array}{c} Am\text{---}X \\ R_1\text{---}SO_2 \\ R_2 \end{array} \quad (I)$$

in which X is a halogen atom, Am is di-lower alkylamino or lower alkyleneimino, each of $R_1$ and $R_2$ is hydrogen or lower alkyl, or their 3-dehydro-derivatives in which X, Am and $R_1$ are as defined above and $R_2$ is an additional carbon-carbon bond to the carbon carrying Am, of corresponding pharmaceutical compositions and of methods for the preparation and application of these products. Said products are useful anti-inflammatory agents in the treatment or management of arthritic and dermatopathologic conditions.

DESCRIPTION OF THE PREFERRED EMBODIMENTS

A halogen atom X is preferably chlorine or bromine, but represents also fluorine or iodine.

Lower alkyl groups $R_1$ and $R_2$ are preferably represented by methyl or ethyl, but also, for example, by n- or i-propyl, -butyl, -pentyl, -hexyl or -heptyl. The term "lower" referred to above and hereinafter in connection with organic radicals or compounds respectively, defines such with up to 7, preferably up to 4, carbon atoms.

A di-lower alkylamino group Am is, for example, dimethylamino, N-methyl-N-ethylamino, diethylamino, di-n-propylamino, di-isopropylamino or di-n-butylamino, and lower alkyleneimino represents, for example, ethyleneimino, pyrrolidino, 2-methyl-pyrrolidino, piperidino, 2- or 4-methyl-piperidino, 1,6- or 2,5-hexamethyleneimino, 1,7- or 2,6-heptamethyleneimino.

The compounds of the invention possess valuable pharmacological properties. For example, they exhibit anti-inflammatory effects, as can be demonstrated in animal tests, using advantageously mammals, such as rats, as test objects. Such tests can be performed, for example, according to Winter et al., Proc. Soc., Exp. Biol. and Med. 111, 544 (1962). According to it, the compounds of the invention are applied, in the form of aqueous solutions or suspensions, by stomach tube to male and female rats, in the dosage range between about 1 and 100 mg./kg./day, preferably between about 5 and 50 mg./kg./day, advantageously between about 10 and 25 mg./kg./day. About 1 hour later an aqueous suspension of carragreenin is injected into the rat's paw and any anti-inflammatory activity can be expressed by the reduction of the volume and/or weight of the edematous paw, as compared with the edematous paw volume or weight of untreated or placebo (saline) treated animals. Besides the above-mentioned utility, the compounds of this invention are also useful intermediates in the manufacture of other valuable products, particularly of pharmacologically active compounds.

Valuable compounds are those of Formula I, in which X is chloro or bromo, Am is di-lower alkylamino or lower alkyleneimino and each of $R_1$ and $R_2$ is sydrogen or lower alkyl, or the 3-dehydro derivatives thereof.

Particularly useful are compounds of Formulae II and III, $$\begin{array}{cc} X_1\text{---}N(C_mH_{2m+1})_2 & X_1\text{---}H(C_mH_{2m+1})_2 \\ O\leftarrow S\text{---}C_nH_{2n+1} & O\leftarrow S\text{---}C_nH_{2n+1} \\ \downarrow \quad C_nH_{2n+1} & \downarrow \\ O & O \\ (II) & (III) \end{array}$$

in which $X_1$ is chloro or bromo and each of $m$ and $n$ is an integer from 1 to 4.

Especially valuable are the compounds of Formulae II and III, in which $X_1$ is chloro or bromo and each of $m$ and $n$ is the integer 1 or 2.

The compounds of the invention are prepared according to methods known in the art, e.g. by (a) Reacting a halomethanesulfonyl halide with a ketene O,N- or N,N-acetal, e.g. compounds of the formulae $$\begin{array}{c} Am \\ | \\ C \\ X\text{---}CH_2 \quad \| \quad R' \\ | \quad\quad + \quad \| \\ SO_2\text{---}X' \quad\quad R_1 \\ \quad\quad C \\ \quad\quad | \\ \quad\quad R_2 \end{array}$$

in which X' is a halogen atom, R' is hydrogen, a lower alkoxy or another Am group, or the 2H-thiete-1,1-dioxides according to the new process, which consists in (b) Reacting a halomethanesulfonyl halide with a di-lower alkyl- or lower alkylene-lower alkynylamine, e.g. compounds of the formulae $$\begin{array}{cc} X\text{---}CH_2 & C\text{---}Am \\ | & + \quad \| \\ SO_2\text{---}X' & C\text{---}R \end{array}$$

The above reactions are carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure. Resulting thietane-1,1-dioxides are usually mixtures of isomers (epimers) and can be separated into single isomers by methods in themselves known, e.g. by fractional crystallization and/or chromatography.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of reactive derivatives or salts thereof. Mainly those starting materials should be used in the process of the invention that lead to the formation of those compounds indicated above as being specially valuable.

The starting material used is known or, if new, may be prepared according to known methods, e.g. those described in Angew. Chem. 1967, p. 767 (744) or J. Org. Chem. 32, 990 (1967).

The pharmacologically active compounds of the invention are useful in the manufacture of pharmaceutical compositions comprising an effective amount thereof in conjunction or admixture with excipients suitable for either enteral, parenteral or topical application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or adsorbents, colorants, flavors and sweeteners. Injectable compositions are preferable aqueous isotonic solutions or suspensions, and suppositories or ointments are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75%, preferably about 1 to 50%, of the active ingredient.

The following examples are intended to illustrate the invention and are not to be construed as being limitations thereon. Temperatures are given in degrees centigrade, and all parts wherever given are parts by weight.

Example 1

To the mixture of 10 g. 1-diethylamino-1-propyne, 9.5 g. triethylamine and 50 ml. tetrahydrofuran, the solution of 13.4 g. chloromethanesulfonyl chloride in 75 ml. tetrahydrofuran is added dropwise while stirring under nitrogen and keeping the temperature at —10°. The reaction mixture is allowed to warm up to room temperature and is stirred for 2 hours. It is filtered, the filtrate evaporated in vacuo and the residue is taken up in the minimum amount of ethanol-diethyl ether. The solution is kept in the refrigerator overnight. The precipitate formed filtered off and washed with ethanol-diethyl ether, to yield the 2-chloro-3-diethylamino-4-methyl-2H-thiete-1,1-dioxide of the formula

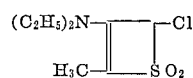

melting at 79–80°.

Example 2

To the mixture of 10 g. 1-diethylamino-1-propyne, 9.5 g. triethylamine and 50 ml. tetrahydrofuran, the solution of 17.45 g. bromomethanesulfonyl chloride in 50 ml. tetrahydrofuran is added dropwise while stirring under nitrogen and keeping the temperature at —10°. The mixture is allowed to warm up to room temperature and is stirred for 2 hours. It is filtered, the filtrate evaporated in vacuo, the residue triturated with ethanol and recrystallized from ethyl acetate-hexane, to yield the 2-bromo-3-diethylamino-4-methyl-2H-thiete-1,1-dioxide of the formula

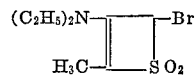

melting at 88–90°.

Example 3

To the stirred mixture of 6 g. 1-dimethylamino-2-methylpropene, 6.5 g. triethylamine and 50 ml. diethyl ether, the solution of 9 g. chloromethanesulfonyl chloride in 30 ml. diethyl ether is added dropwise between 0 and —5°. After stirring for 3 hours at room temperature, the mixture is filtered and the filtrate concentrated. The precipitate formed is filtered off, washed with cold diethyl ether and recrystallized from hexane to yield the cis-2-chloro-3-dimethylamino-4,4-dimethylthietane-1,1-dioxide of the formula

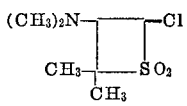

melting at 100 to 102°.

The mother liquors are combined, concentrated to a small volume, the precipitate formed filtered off and recrystallized from pentane, to yield the trans-2-chloro-3-dimethylamino-4,4-dimethylthietane-1,1-dioxide of the formula

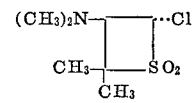

melting at 59 to 64°.

Example 4

To the mixture of 8.7 g. 1-pyrrolidino-2-methylpropene, 6.72 g. triethylamine and 50 ml. diethyl ether, the solution of 10 g. chloromethanesulfonyl chloride in 35 ml. diethyl ether is added dropwise at 0° while stirring. After stirring for 2½ hours at room temperature the mixture is filtered and the filtrate evaporated. The residue is triturated with diethyl ether-ethanol and recrystallized from diethyl ether-pentane, to yield the trans-2-chloro-3-pyrrolidino-4,4-dimethylthietane-1,1-dioxide of the formula

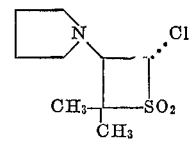

melting at 99 to 100°.

Example 5

Preparation of 10,000 tablets each containing 25 mg. of the active ingredient:

| Formula: | G. |
|---|---|
| 2-chloro-3-diethylamino-4-methyl-2H-thiete-1,1-dioxide | 250.00 |
| Lactose | 1,956.00 |
| Corn starch | 90.00 |
| Polyethylene glycol 6,000 | 90.00 |
| Talcum powder | 90.00 |
| Magnesium stearate | 24.00 |
| Purified water, q.s. | |

Procedure: All the powders are passed through a screen with openings of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

We claim:
1. A compound of the formula

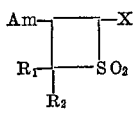

in which X is a halogen atom, Am is di-lower alkylamino, ethyleneimino, pyrrolidino, 2-methylpyrrolidino, piperidino, 2- or 4-methyl-piperidino, 1,6- or 2,5-hexamethyleneimino, 1,7- or 2,6-heptamethyleneimino, $R_1$ is hydrogen or lower alkyl, and $R_2$ is hydrogen, lower alkyl or an additional carbon-carbon bond to the carbon carrying Am.

2. A compound as claimed in claim 1, in which formula X is chloro or bromo and the other symbols have the meaning given in claim 1.

3. A compound as claimed in claim 2 and having the formula

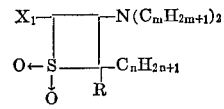

in which $X_1$ is chloro or bromo, each of $m$ and $n$ is an integer from 1 to 4 and R is $C_nH_{2n+1}$ or an additional carbon-carbon bond to the carbon carrying nitrogen.

4. A compound as claimed in claim 3, in which formula $X_1$ is chloro or bromo, each of $m$ and $n$ is the integer 1 or 2 and R is methyl, ethyl, or an additional carbon-carbon bond to the carbon carrying nitrogen.

References Cited
UNITED STATES PATENTS
3,644,632  2/1972  Rosen et al. _____ 424—275

HENRY R. JILES, Primary Examiner
C. M. S. JAISLE, Assistant Examiner

U.S. Cl. X.R.
260—293.68, 326.82; 424—267, 274, 275